(12) United States Patent
An

(10) Patent No.: US 11,422,761 B2
(45) Date of Patent: Aug. 23, 2022

(54) IMAGE FORMING APPARATUS CHANGING PRINTING ORDERS ACCORDING TO STRENGTH OF A WIRELESS COMMUNICATION SIGNAL

(71) Applicant: Hewlett-Packard Development Company, L.P., Spring, TX (US)

(72) Inventor: Chang Nam An, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/291,327

(22) PCT Filed: Aug. 9, 2019

(86) PCT No.: PCT/US2019/045912
§ 371 (c)(1),
(2) Date: May 5, 2021

(87) PCT Pub. No.: WO2020/185250
PCT Pub. Date: Sep. 17, 2020

(65) Prior Publication Data
US 2022/0027107 A1    Jan. 27, 2022

(30) Foreign Application Priority Data
Mar. 14, 2019   (KR) .................. 10-2019-0029306

(51) Int. Cl.
*G06F 3/12*   (2006.01)

(52) U.S. Cl.
CPC .......... *G06F 3/1263* (2013.01); *G06F 3/1222* (2013.01); *G06F 3/1238* (2013.01); *G06F 3/1292* (2013.01)

(58) Field of Classification Search
None
See application file for complete search history.

(56) References Cited

U.S. PATENT DOCUMENTS

| 6,151,464 | A | * | 11/2000 | Nakamura | ......... H04N 1/32122 |
|---|---|---|---|---|---|
| | | | | | 399/81 |
| 8,830,496 | B2 | | 9/2014 | Itogawa et al. | |
| 8,982,389 | B2 | * | 3/2015 | Sasaki | ................ H04N 1/00408 |
| | | | | | 358/1.14 |

(Continued)

FOREIGN PATENT DOCUMENTS

| JP | 2006-227795 A | 8/2006 |
|---|---|---|
| JP | 2006227795 A * | 8/2006 |

(Continued)

OTHER PUBLICATIONS

English translation of Publication KR100366642B1 (Abstract). (Year: 2003).*

(Continued)

*Primary Examiner* — Thomas D Lee
(74) *Attorney, Agent, or Firm* — Jefferson IP Law, LLP

(57) ABSTRACT

An example image forming apparatus includes a print engine to form an image, a memory to store a plurality of print data and user information corresponding to each of the plurality of print data, a communication apparatus to communicate with a terminal through a wireless communication method, and a processor to control the print engine to print the plurality of print data.

17 Claims, 10 Drawing Sheets

(56) References Cited

U.S. PATENT DOCUMENTS

| | | |
|---|---|---|
| 10,133,525 B2 | 11/2018 | Nathani et al. |
| 2012/0236351 A1* | 9/2012 | Arima ................ G06K 15/1809 |
| | | 358/1.15 |
| 2015/0138596 A1* | 5/2015 | Kikuchi ................ G06F 3/1207 |
| | | 358/1.15 |
| 2016/0224292 A1 | 8/2016 | Fujikura |
| 2017/0068493 A1 | 3/2017 | Kulkarni et al. |

FOREIGN PATENT DOCUMENTS

| | | |
|---|---|---|
| JP | 2014-200915 A | 10/2014 |
| JP | 2015-178181 A | 10/2015 |
| JP | 2016-147475 A | 8/2016 |

OTHER PUBLICATIONS

English translation of Japanese Application 2005-039096, corresponding to Japanese Application Publication 2006-227795. (Year: 2005).*

* cited by examiner

FIG. 5B

| No | Job ID | Document Name | Status | User Name | Pages |
|---|---|---|---|---|---|
| 1 | print 001 | Full_Page_Photo.jpg | Started | Device A | 1 |
| 2 | print 004 | annual_report_2018.pdf | - | Device B | 55 |
| 3 | print 003 | Letter_20190115.docx | - | Device C | 2 |
| 4 | print 002 | Assignment.docx | - | Device B | 10 |
| 5 | print 005 | test.docx | - | Device B | 1 |

IMAGE FORMING APPARATUS CHANGING PRINTING ORDERS ACCORDING TO STRENGTH OF A WIRELESS COMMUNICATION SIGNAL

BACKGROUND

An image forming apparatus may generate, print, receive, or transmit image data. Representative examples thereof may include a printer, a copier, a facsimile, and a multi-function peripheral (MFP) in which the functions of the above-described devices are combined.

An image forming apparatus may receive a plurality of print data from an external apparatus and sequentially print the plurality of print data according to the received order.

BRIEF DESCRIPTION OF THE DRAWINGS

Certain examples of the present disclosure will be more apparent from the following description taken in conjunction with the accompanying drawings, in which:

FIG. 5B is a diagram illustrating a table for a printing order after change, according to an example;

The same reference numerals are used to represent the same elements throughout the drawings.

DETAILED DESCRIPTION

One or more examples will be described below with reference to the accompanying drawings. The examples described below may be modified and implemented in various different forms. To describe features of the examples, detailed descriptions of matters well known to those skilled in the art to which the examples described below pertain will be omitted herein.

In the following description, the term "connected to" or "coupled to" that is used to designate a connection or coupling of one element to another element includes both a case in which the one element is "directly connected to" or "directly coupled to" the other element and a case in which the one element is connected or coupled to the other element via still another element. Further, it should be understood that the term "includes" means that other constituent elements may be further included rather than excluding the other constituent elements unless specially mentioned to the contrary.

As used herein, the term "image forming job" may refer to any of various jobs associated with an image (e.g., copying, printing, scanning, or faxing), such as forming an image or generating, storing, or transferring an image file. The term "job" may include not only an image forming job but also a series of processes necessary for performing an image forming job.

In addition, an image forming apparatus generally operates to print out print data provided from a terminal such as a computer onto a printing paper. Examples of such an image forming apparatus may include a copier, a printer, a facsimile, a scanner, and a Multi-Function Peripheral (MFP) that has multiple functions of the above-described apparatuses in one unit. The image forming apparatus may refer to any device that can perform an image forming job, such as the printer, the copier, the scanner, the fax machine, the MFP, or a display apparatus.

Further, the term "content" may mean any kind of data that is an object of an image forming job, such as a photo, an image, a document file, or the like.

Further, the term "print data" may mean data that is converted into a printable format in a printer. On the other hand, if the printer supports direct printing, the file itself may become the print data.

Further, the term "user" may mean a person who performs an operation that is related to an image forming job using an image forming apparatus or a device that is connected to the image forming apparatus by wire or wirelessly. Further, the term "manager" may mean a person who has the right to access all functions of the image forming apparatus and the system. The manager and the user may be the same person.

Figure 1:
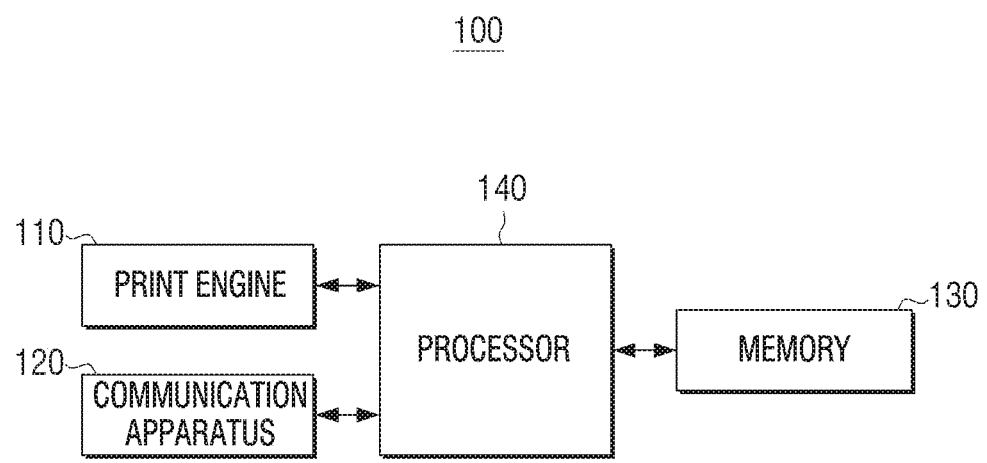
FIG. 1 is a block diagram illustrating an image forming apparatus, according to an example.

FIG. 1 is a block diagram illustrating an image forming apparatus, according to an example.

Referring to FIG. 1, an image forming apparatus 100 may include a print engine 110, a communication apparatus 120, a memory 130, and a processor 140.

The print engine 110 may form an image on a printing medium, such as paper, using various printing methods such as an electrophotographic method, an inkjet method, a thermal transfer method, a thermal method, or the like. In the electrophotographic method, the print engine 110 may include a photosensitive drum, a charger, an exposure apparatus, a developer, a transferring apparatus, and a fusing apparatus.

The communication apparatus 120 may communicate with an external apparatus. For example, the communication apparatus 120 may communicate with an external apparatus located in the vicinity of the image forming apparatus 100.

As an example, the communication apparatus 120 may perform communication in the form of being connected to an external apparatus not only through a local area network (LAN)) and the Internet, but also through a universal serial bus (USB) port or a wireless communication (for example, WiFi 802.11a/b/g/n, near field communication (NFC), Bluetooth, Bluetooth Low Energy (BLE), etc.) port. The communication apparatus 120 may be referred to as a 'transceiver'.

The communication apparatus 120 may receive a job execution command from an external apparatus. In addition, the communication apparatus 120 may transceive data related to the job execution command. For example, when a job command of the user is to print a specific file, the communication apparatus 120 may receive print data.

As an example, the print data may be data in a printer language such as postscript (PS), printer control language (PCL), etc. In addition, when the image forming apparatus 100 supports a direct printing function, the print data may be files such as PDF, XPS, BMP, JPG, etc.

The communication apparatus 120 may simultaneously receive print data together with user information. For example, the communication apparatus 120 may receive user information of a user which corresponds to print data received from an external apparatus.

In an example, the user information may include information on a user account (e.g., an ID, a password, etc.) and may include a token assigned for each user account.

The memory 130 may store print data received from an external apparatus. For example, when the image forming apparatus 100 receives a plurality of print data from an external apparatus, the memory 130 may store the received plurality of print data.

The memory 130 may store the received user information along with the print data received from the external apparatus. For example, when the image forming apparatus 100 receives, from the external apparatus, the plurality of print data and the user information corresponding to each of the plurality of print data, the memory 130 may store the user information corresponding to each of the plurality of print data.

The processor 140 may control each element within the image forming apparatus 100. The processor 140 may be configured as one apparatus such as a central processing unit (CPU), and may also be configured as a plurality of apparatuses such as a clock generation circuit, a CPU, a graphic processing unit (GPU), etc.

The processor 140 may control the print engine 110 to sequentially print the plurality of print data. For example, the processor 140 may control the print engine 110 to sequentially print the plurality of print data received from the external apparatus according to the received order.

The processor 140 may, in a process of printing the plurality of print data, change a printing order of waiting print data. An example operation of changing a printing order of waiting print data is provided below.

In an example operation, the processor 140 may communicate with a terminal that is near the image forming apparatus 100 through the communication apparatus 120 using a wireless communication method.

In various examples, the terminal may include a portable terminal or a fixed terminal. The portable terminal may include a movable electronic apparatus that can be easily carried, which may be a video telephone, a mobile phone, a smart phone, a portable computer (e.g., a notebook PC, a tablet PC, etc.), or the like. In addition, the fixed terminal may be a desktop personal computer (PC), a smart TV, etc. However, the terminal is not limited to the examples mentioned above.

The processor 140 may identify whether a terminal is approaching, based on a strength of a communication signal with a terminal connected through a wireless communication method.

For example, the processor 140 may calculate a distance between the image forming apparatus 100 and a terminal by using a communication signal strength with the connected terminal, and identify whether the terminal is approaching depending on whether the calculated distance is increased or decreased.

For example, the processor 140 may, when the calculated distance is increased, identify that the terminal moves away from the image forming apparatus 100, and, when the calculated distance is decreased, identify that the terminal is approaching the image forming apparatus 100. In an example, when the calculated distance is constant, the processor 140 may identify that the terminal maintains its distance from the image forming apparatus 100.

In various examples, the wireless communication method may be a BLE method, and the communication signal may be a BLE signal. However, the wireless communication method is not limited to these examples.

The processor 140 may, when it is identified that the terminal is approaching, change a printing order of the plurality of print data.

For example, the processor 140 may, when it is identified that the terminal is approaching, identify print data related to the terminal from among the plurality of print data, and change a printing order so that the printing order of the identified print data is advanced.

As an example, the processor 140 may receive user information of a user of the terminal from the terminal, and identify print data related to the terminal by comparing the received user information with user information corresponding to each of the plurality of print data. Further, a printing order may be changed so that the printing order of the identified printing data is advanced.

This is to reduce a waiting time of a user of the terminal by advancing a printing order of print data of the user because it may be inferred from the terminal approaching the image forming apparatus 100 that the user is approaching the image forming apparatus 100 and the user may be approaching the image forming apparatus 100 to retrieve an output of his or her print data.

When a printing order of the print data of the user approaching is advanced without limitation, a printing order of print data of other users is pushed back and a waiting time of the other users is increased, which may cause an inconvenience to other users.

The processor 140 may, when it is identified that the terminal is approaching, identify print data corresponding to a user of the terminal and change a print order of waiting print data. For example, the processor 140 may, when it is identified that the terminal is approaching, identify whether the number of print data corresponding to a user of the terminal and currently waiting is more than one, and change a print order among the plurality of waiting print data corresponding to the user of the terminal.

For example, the processor 140, when one currently waiting print data corresponding to the user of the terminal is present, may not change a printing order. In an example, the processor 140, when a plurality of currently waiting print data corresponding to the user of the terminal are present, change a printing order among the plurality of waiting print data.

In an example, even if the terminal is approaching the image forming apparatus 100, the user of the terminal may not desire to change a printing order.

The processor 140 may, when it is identified that the terminal is approaching, control the communication apparatus 120 to inquire of the terminal whether it is necessary or desired to change an order among the waiting plurality of print data.

If a request for order change is not received from the terminal or information regarding the unnecessity of an order change is received from the terminal, the processor 140 may maintain the printing order.

In contrast, if a request for order change is received from the terminal, the processor 140 may change an order among the waiting plurality of print data.

In an example, the processor 140 may receive, from the terminal, information on at least one print data to advance in order among the waiting plurality of print data corresponding to the user of the terminal. In addition, a printing order of the at least one print data may be advanced within the order among the waiting plurality of print data corresponding to the user of the terminal. An example operation will be described below with reference to FIGS. 3, 4, 5A and 5B.

The processor 140 may control the communication apparatus 120 to transmit information on the changed printing order to the terminal.

The processor 140 may control the print engine 110 to sequentially print the plurality of print data according to the changed printing order.

When it is identified that a distance of the terminal from the image forming apparatus 100 is increasing or a distance of the terminal from the image forming apparatus 100 is maintained, the processor 140, may not change a printing order of the plurality of print data, and may control the print engine 110 to sequentially print the plurality of print data according to a previous printing order.

Although the above examples illustrate and explain a simple constitution of an image forming apparatus, various elements may be additionally included in other implementations. Examples of this will be explained below by referring to FIG. 2.

Figure 2:
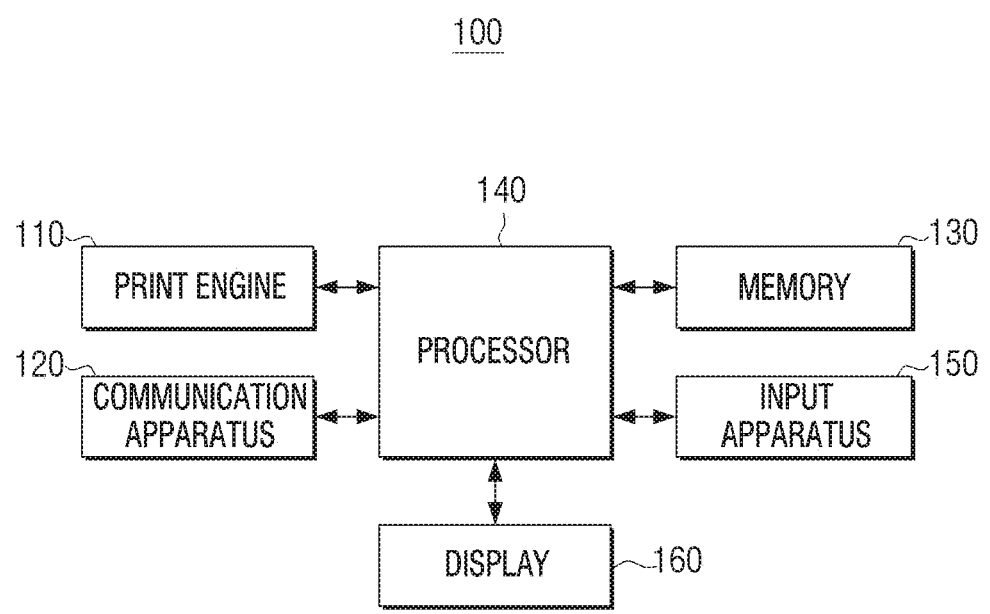
FIG. 2 is a block diagram illustrating an image forming apparatus, according to an example.

FIG. 2 is a block diagram illustrating an image forming apparatus, according to an example.

Referring to FIG. 2, the image forming apparatus 100 may include a print engine 110, a communication apparatus 120, a memory 130, a processor 140, an input apparatus 150, and a display 160.

The print engine 110, the communication apparatus 120, and the memory 130 perform the same functions as those of the elements of FIG. 1, and thus a duplicate explanation thereof will be omitted. In addition, the processor 140 is explained with reference to FIG. 1, and thus will not be further explained below for the sake of brevity. Only added elements in FIG. 2 are explained below.

The input apparatus 150 may receive an input of a user's function selection and a control command corresponding to the function. Here, the function may include printing, copying, scanning, and fax transmission. The function control command as described above may be input through a control menu that is displayed on the display 160. The input apparatus 150 may be a keyboard, a mouse, a touch pad, a touch screen, and the like.

The input apparatus 150 may receive an input of settings for a printing order change function. For example, the input apparatus 150 may, when a plurality of print data are received, receive an input of settings for whether a function to change a printing order of the plurality of print data is activated, based on a strength of a communication signal with a terminal connected through a wireless communication method.

The display 160 may display various information of the image forming apparatus 100. For example, the display 160 may display a user interface window for selecting various functions provided in the image forming apparatus 100. A function of the image forming apparatus may be selected on the display 160, and the display 160 may display a user interface window for providing options corresponding to each function.

When a plurality of print data are received, the display 160 may display a printing order of the plurality of print data. If the printing order has been changed by the processor 140, the display 160 may display the changed printing order of the plurality of print data.

In an example, the image forming apparatus 100, based on a strength of a communication signal with a terminal connected through a wireless communication method, may change an order among corresponding print data, and thus a user carrying the terminal can more quickly retrieve an output of a specific print data solely by approaching the image forming apparatus. By changing an order of the print data based on the user approaching the image forming apparatus, the user may avoid the inconvenience of having to wait for sequential output of the print data that is waiting. It may be especially convenient in a case where the user urgently needs an output of a certain print data but a large amount of print data are waiting ahead of the certain print data in the image forming apparatus.

In an example, the image forming apparatus 100 may change a printing order among print data corresponding to the approaching user so that the inconvenience caused by changing a printing order of print data of users other than the approaching user may be prevented.

FIGS. 3, 4, 5A, and 5B are diagrams provided to explain an example in which a printing order is changed using a strength of a wireless communication signal.

Figure 3:
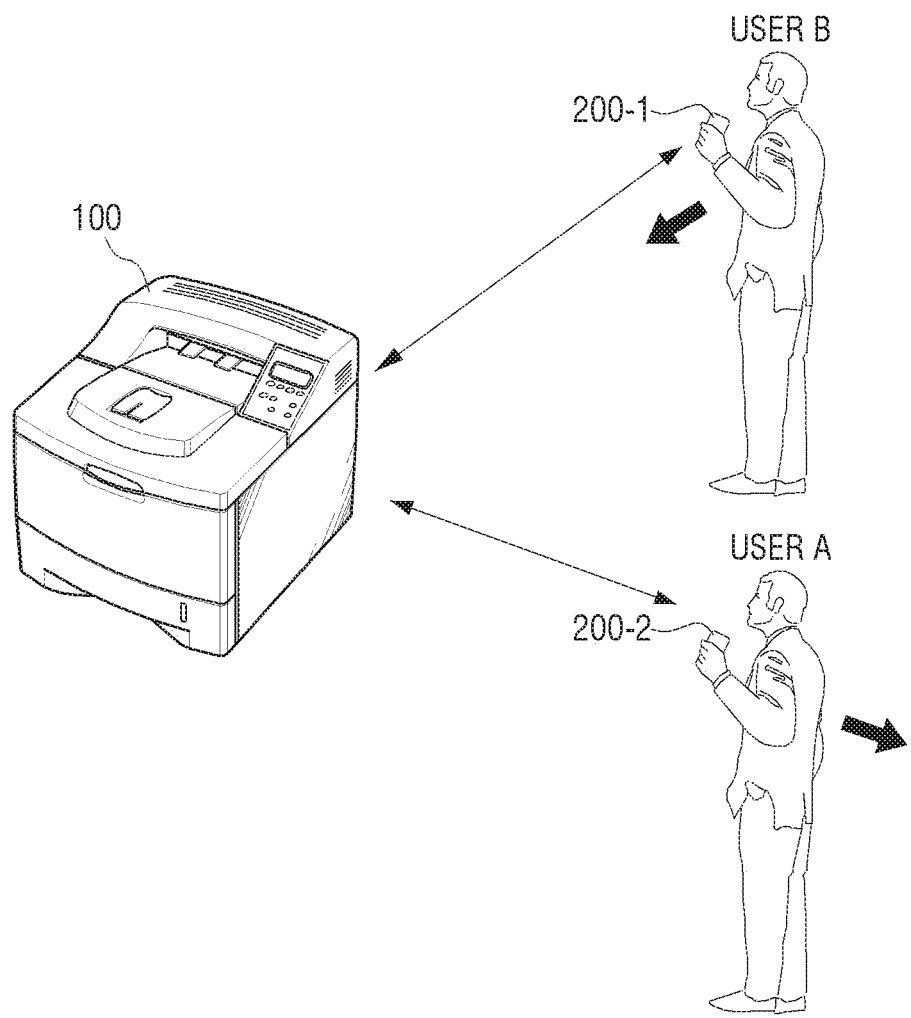
FIG. 3 is a diagram provided to explain a method for identifying whether a user is approaching, using a strength of a wireless communication signal, according to an example.

FIG. 3 is a diagram provided to explain a method for identifying whether a user is approaching, using a strength of a wireless communication signal, according to an example.

Referring to FIG. 3, the image forming apparatus 100 may receive and store a plurality of print data and communicate with a plurality of terminals 200-1 and 200-2 through a wireless communication method. In an example described below, it will be assumed that the wireless communication method is a BLE method. However, it is to be understood that the use of the BLE method is merely an example and not meant to exclude the use of other communication methods.

Each of the plurality of terminals 200-1 and 200-2 may broadcast a BLE advertising packet to the image forming apparatus 100 at predetermined periods. Here, the BLE advertising packet may include user information of users (i.e., USER B and USER A) of each of the plurality of terminals 200-1 and 200-2.

The image forming apparatus 100 may perform scanning and receive an advertising packet of each of the plurality of terminals 200-1 and 200-2.

The image forming apparatus 100 may transmit a request for connection to each of the plurality of terminals 200-1 and 200-2 and perform pairing with the plurality of terminals 200-1 and 200-2.

The image forming apparatus 100 may receive a plurality of print data and user information corresponding to the plurality of print data from each of the plurality of terminals 200-1 and 200-2. Further, the image forming apparatus 100 may receive a plurality of print data and user information corresponding to the plurality of print data from an additional host apparatus other than the plurality of terminals 200-1 and 200-2.

The image forming apparatus 100 may sequentially print the plurality of print data according to the received order.

In an example, the plurality of users may carry the plurality of terminals 200-1, 200-2, respectively. For example, referring to FIG. 3, the user B may carry the terminal 200-1 and the user A may carry the terminal 200-2.

Each of the plurality of users may move away from or move toward the image forming apparatus 100 and accordingly, the plurality of terminals 200-1 and 200-2 may respectively move away from or move toward the image forming apparatus 100 as well.

For example, referring to FIG. 3, the user B is approaching the image forming apparatus 100 and thus, the terminal 200-1 may move toward the image forming apparatus 100. Further, the user A moves away from the image forming apparatus 100 and thus, the terminal 200-2 may move away from the image forming apparatus 100.

In this case, the image forming apparatus 100 may calculate a distance between the image forming apparatus 100 and each of the plurality of terminals 200-1 and 200-2 using a strength of a communication signal with each of the plurality of terminals 200-1 and 200-2.

The image forming apparatus 100 may identify whether either of the plurality of terminals 200-1 and 200-2 is approaching based on the calculated distance and may change an order among print data corresponding to each of the plurality of terminals 200-1 and 200-2.

In the example of FIG. 3, the terminal 200-2 is moving away from the image forming apparatus 100 and thus, a distance from the terminal 200-2 calculated using a communication signal strength may be increased. In this case, the image forming apparatus 100 may maintain an order among print data corresponding to the terminal 200-2.

In contrast, the terminal 200-1 is approaching the image forming apparatus 100 and thus, a distance from the terminal 200-1 calculated using a communication signal strength may be decreased. In this case, the image forming apparatus 100 may change an order among print data corresponding to the terminal 200-1.

An example operation of changing an order among the print data corresponding to the terminal 200-1 by the image forming apparatus 100 will be described below.

Figure 4:
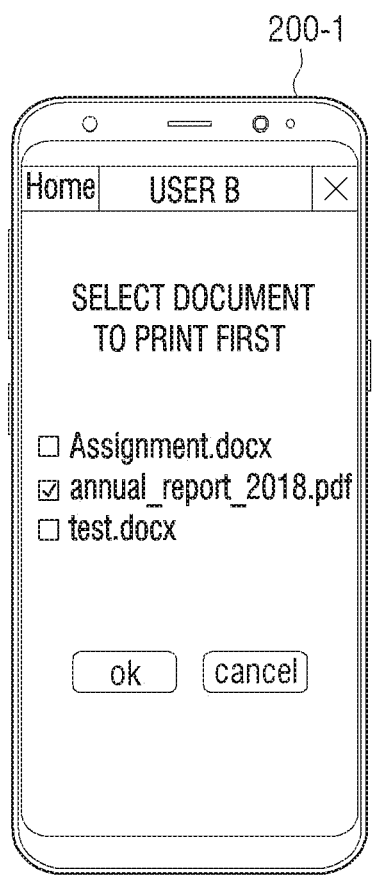
FIG. 4 is a diagram illustrating a user interface for selecting a target whose printing order is to be changed, according to an example.

FIG. 4 is a diagram illustrating a user interface for selecting a target whose printing order is to be changed, according to an example.

Referring to FIG. 4, the image forming apparatus 100 may transmit information on print data of the user B to the terminal 200-1, and the terminal 200-1 may display the received print data information through a user interface.

For example, the image forming apparatus 100 may, based on user information of a user of the terminal 200-1 and user information respectively corresponding to a plurality of pre-stored print data, identify a print data corresponding to the user from among the plurality of print data. Based on the identification of the print data corresponding to the user from among the plurality of print data, the image forming apparatus 100 may transmit information on the identified print data to the terminal 200-1.

For example, referring to FIG. 4, the image forming apparatus 100 may identify "Assignment.docx", "annual_report_2018.pdf" and "test.docx" as print data corresponding to the user B from among the plurality of print data. The image forming apparatus 100 may transmit information on the identified print data to the terminal 200-1. The terminal 200-1 may display the received information on the display.

The terminal 200-1 may receive, from the user, an input to select at least one print data of which an order is to be advanced from among the displayed print data through the user interface. The terminal 200-1 may transmit information on the selected print data to the image forming apparatus 100.

For example, referring to FIG. 4, it can be understood that the terminal 200-1 receives a user selection of "annual_report_2018.pdf" for a print data of which an order is to be advanced. Accordingly, the terminal 200-1 may transmit information on the "annual_report_2018.pdf" to the image forming apparatus 100.

In an example as illustrated in FIG. 4, a terminal displays only information on a print data corresponding to a user of the terminal. However, in other examples, the terminal may receive information on a printing order of all waiting print data from the image forming apparatus and may display the received information. In this case, the user interface may be set to receive, from a user of the terminal, selection of only the print data corresponding to the user as a print order change target even if the information on all the waiting print data is displayed.

Figure 5A:
FIG. 5A is a diagram illustrating a table for a printing order before change, according to an example.

FIG. 5A is a diagram illustrating a table for a printing order before change, according to an example.

Referring to FIG. 5A, a table for a printing order of the image forming apparatus 100 may include information on a printing order, a job ID, print data information (e.g., a document name), a state or status, a user name (e.g., an apparatus name, a device name, etc.), and the number of pages.

Here, before a printing order change, the printing order may be basically set according to an order in which the image forming apparatus 100 receives each print data. Referring to FIG. 5A, it can be understood that print data corresponding to the user B are "Assignment.docx", "annual_report_2018.pdf" and "test.docx", and that the printing orders are second, fourth, and fifth, respectively.

In an example, the image forming apparatus 100 may receive information of "annual_report_2018.pdf" from the terminal 200-1 as a print order change target. Further, the image forming apparatus 100 may advance a printing order of "annual_report_2018.pdf" within an order among the print data corresponding to the user B.

That is, a print data of which an order is higher from among "Assignment.docx", "annual_report_2018.pdf" and "test.docx" is "annual_report_2018.pdf", and thus the image forming apparatus 100 may change printing orders of "Assignment.docx" and "annual_report_2018.pdf" and advance the printing order of "annual_report_2018.pdf".

FIG. 5B is a diagram illustrating a table for a printing order after change, according to an example.

Referring to FIG. 5B, it can be understood that the printing orders of "Assignment.docx" and "annual_report_2018.pdf" are changed and that the printing orders of "annual_report_2018.pdf" and "Assignment.docx" are second and fourth, respectively.

As described above, the image forming apparatus 100 may, even when connected with a plurality of terminals through a wireless communication method, change a printing order according to whether the plurality of terminals are approaching.

In FIGS. 3, 4, 5A, and 5B, the image forming apparatus performs communication with a plurality of terminals by using a BLE method. However, in actual implementation, it may be implemented that the communication may be performed using a wireless communication method other than the BLE method.

Figure 6:
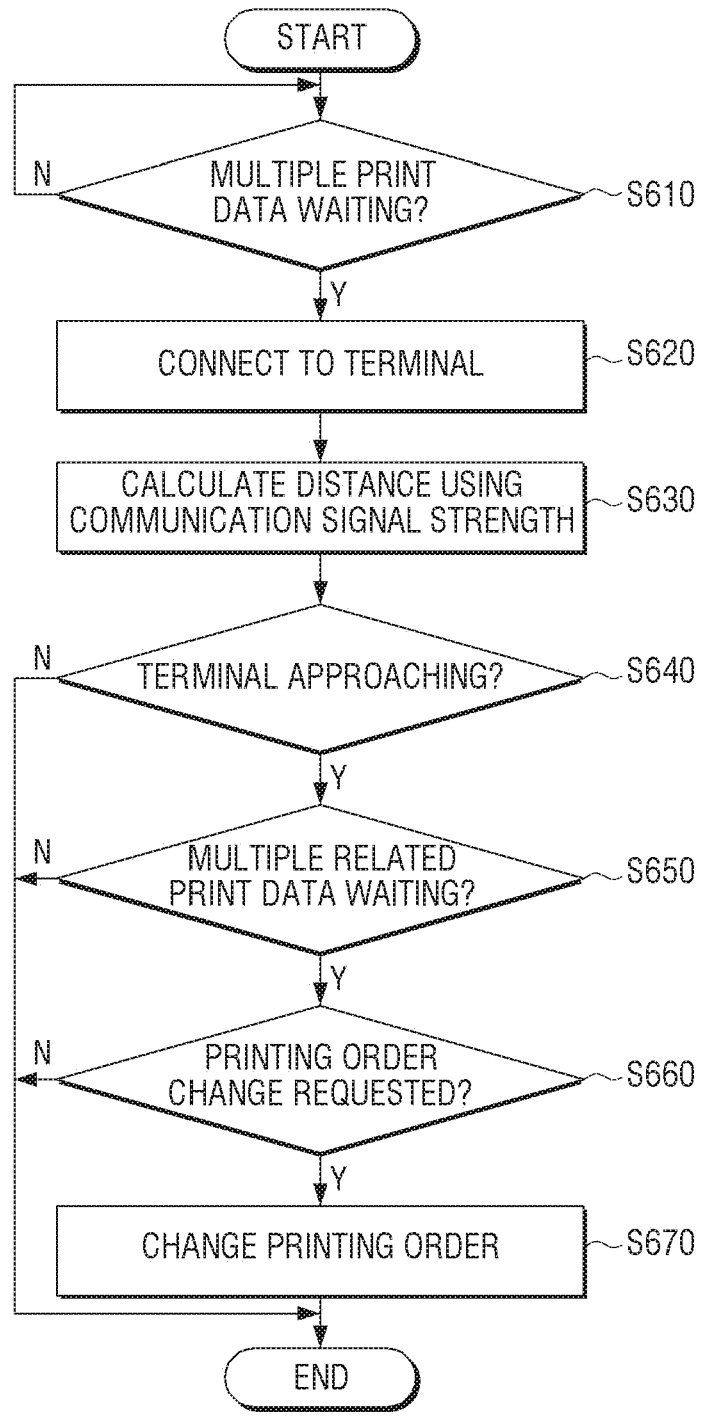
FIG. 6 is a diagram provided to explain a printing order changing algorithm using a strength of a wireless communication signal, according to an example.

FIG. 6 is a diagram provided to explain a printing order changing algorithm using a strength of a wireless communication signal, according to an example.

Referring to FIG. 6, the processor 140 of the image forming apparatus 100 may first identify whether a plurality of waiting print data are present, at operation S610.

If one waiting print data is present, S610-N, it is not necessary to change a printing order and thus, the process may be returned to the starting step.

In contrast, if a plurality of waiting print data are present, S610-Y, the processor 140 may connect to a terminal using a wireless communication method. For example, the processor 140 may activate the communication apparatus 120, and connect with a peripheral terminal through a wireless communication method at operation S620.

The processor 140 may calculate a distance between the image forming apparatus 100 and the connected terminal using a strength of a communication signal with the terminal at operation S630.

The processor 140 may identify whether the terminal is approaching based on the calculated distance, at operation S640. For example, the processor 140 may identify that when the calculated distance is decreased, the terminal is approaching the image forming apparatus 100, that when the calculated distance is increased, the terminal is moving away from the image forming apparatus 100, and that when the calculated distance is maintained, the terminal is not moving.

When it is identified that the terminal is moving away or not moving, S640-N, changing the printing order is not necessary and the process may be terminated.

In contrast, when it is identified that the terminal is approaching, S640-Y, the processor 140 may identify whether a plurality of print data corresponding to a user of the terminal from among the plurality of print data are waiting, at operation S650.

When one print data corresponding to the user of the terminal is waiting (i.e., a plurality of print data corresponding to the user is not waiting), S650-N, changing the printing order is unnecessary and the process may be terminated.

In contrast, when a plurality of print data corresponding to the user of the terminal are waiting, S650-Y, the processor 140 may inquire of the terminal whether it is necessary or desired to change the printing order among the plurality of waiting print data corresponding to the user of the terminal at operation S660.

For example, the processor 140 may, while information on the plurality of waiting print data corresponding to the user of the terminal are transmitted to the terminal, inquire of the terminal whether it is necessary to change the printing order.

If a request for order change is not received from the terminal or information regarding the unnecessity of order change is received from the terminal, changing the printing order may be regarded as unnecessary and the process may be terminated.

In contrast, if a request for order change is received from the terminal, S660-Y, the processor 140 may change an order among the waiting plurality of print data, at operation S670.

For example, the processor 140 may receive from the terminal an order change request together with information on at least one print data of which the printing order is to be advanced, and advance the printing order of the at least one print data within an order among the plurality of waiting print data corresponding to the user of the terminal.

The processor 140 may, under a limited condition, further change a printing order between a print order corresponding to another user and the at least one print data described above.

For example, user information may include information on whether a printing order change is permitted. The information on whether a printing order change is permitted may refer to information on whether, when a print data corresponding to specific user information (e.g., user A) is waiting in the image forming apparatus 100, it is permitted to change a printing order of a print data corresponding to another user information with a subsequent printing order to have a printing order preceding a print data corresponding to the specific user information (e.g., user A).

Further, the processor 140 may, based on user information of a print data corresponding to another user with an order preceding at least one print data, identify whether changing a printing order of the print data with the precedence order is permitted.

If changing a printing order of the print data with the precedence order is permitted, the processor 140 may advance the printing order of the at least one print data as compared with the print data with the precedence order.

If changing a printing order of the print data with the precedence order is not permitted, the processor 140 may maintain the printing order of the at least one print data without further advancing.

The image forming apparatus 100 may be printing at least one print data of which an order is to be advanced or the image forming apparatus 100 may be printing the at least one print data and the print data of which the order is to be advanced. In this case, changing a printing order is not possible and thus, the processor 140 may maintain the printing order.

The processor 140 may transmit, to a terminal, a message indicating that changing a printing order is not possible.

In FIG. 6, it is identified whether a terminal is approaching based on a distance calculated using a strength of a communication signal with the terminal and then, it is identified whether the number of print data related to the terminal is more than one. However, in actual implementation, it may be implemented such that it is first identified whether the number of print data related to the terminal is more than one, and then that it is identified whether the terminal is approaching based on a distance calculated using a strength of a communication signal with the terminal.

Figure 7:
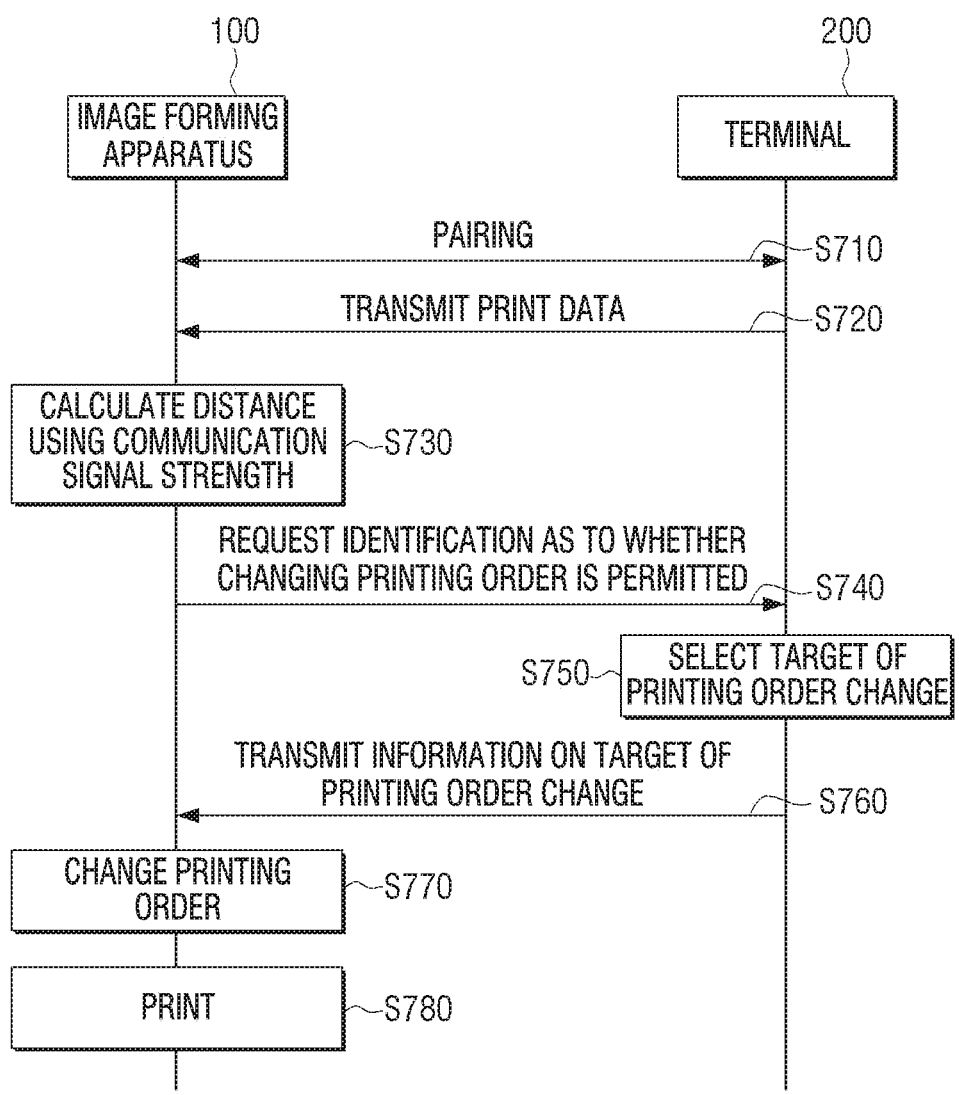
FIG. 7 is a sequence diagram of a method for changing a printing order, according to an example.

FIG. 7 is a sequence diagram of a method for changing a printing order, according to an example.

Referring to FIG. 7, the image forming apparatus 100 and the terminal 200 may communicate with each other through a wireless communication method, at operation S710. For example, the terminal 200 may broadcast a BLE advertising packet, the image forming apparatus 100 may perform scanning and receive the BLE advertising packet, and the image forming apparatus 100 may transmit a connection request to the terminal 200 and perform pairing.

The terminal 200 may transmit a plurality of print data and user information corresponding to the plurality of print data, at operation S720. Accordingly, the image forming apparatus 100 may establish a printing order of the entire print data according to received orders of not only the plurality of print data received from the terminal 200 but also a print data received from another apparatus (not illustrated).

The image forming apparatus 100 may calculate a distance between the image forming apparatus and the terminal 200 by using a strength of a communication signal with the terminal 200, at operation S730. For example, the image forming apparatus 100 may calculate a distance using a strength of a BLE signal with the terminal 200.

The image forming apparatus 100 may, when a calculated distance is decreased, inquire of the terminal 200 whether it is necessary to change an order among a plurality of waiting print data corresponding to a user of the terminal at operation S740.

For example, the image forming apparatus 100 may inquire of the terminal 200 whether it is necessary to change an order, while transmitting information on the plurality of waiting print data corresponding to the user of the terminal to the terminal 200.

The terminal 200 may display the received print data information via a user interface and allow a user selection of at least one print data of which an order is to be advanced from among the displayed print data, at operation S750.

The terminal 200 may transmit information on the selected print data to the image forming apparatus 100, at operation S760.

The image forming apparatus 100 may advance a printing order of the received selected print data from among the plurality of waiting print data corresponding to the user of the terminal 200, at operation S770.

The image forming apparatus 100 may sequentially print the plurality of print data according to the changed printing order, at operation S780.

In an example, the image forming apparatus 100 may be connected to a plurality of terminals and receive a print data from each of the plurality of terminals. Changing a printing order may be permitted when user information corresponding to each of the plurality of terminals is considered.

In this case, the image forming apparatus 100 may change a printing order so that a printing order of a print data corresponding to a terminal approaching the image forming apparatus 100 from among the plurality of terminals precedes a printing order of a print data corresponding to another terminal.

In an example, each of the plurality of terminals may simultaneously approach the image forming apparatus 100. In this case, the image forming apparatus 100 may calculate a distance from each of the plurality of terminals based on a strength of a communication signal with each of the plurality of terminals, and change a printing order so that the print data corresponding to a terminal with lowest calculated distance (i.e., closest to the image forming apparatus 100) precedes the print data corresponding to the other terminals.

In an example, while each of the plurality of terminals approaches the image forming apparatus 100, the distances between the image forming apparatus 100 and each of the plurality of terminals may be the same. In this case, the image forming apparatus 100 may change the printing order so that a print data corresponding to a terminal identified to first arrive at the same distance from among the plurality of terminals precedes the print data corresponding to the other terminals.

In an example, a user corresponding to a specific terminal may first arrive near the image forming apparatus 100 and then there may be another user who arrives at a position closer to the image forming apparatus 100. In this case, it is necessary to prevent a printing order of the print data corresponding to the other users from being earlier than a printing order of a print data corresponding to a user who arrives first just because the other user is located closer to the image forming apparatus 100.

Accordingly, the image forming apparatus 100 may provide additional information on a print data of which the printing order is advanced. For example, the image forming apparatus 100 may provide flag information indicating whether a printing order is advanced, with respect to the print data of which the printing order is advanced.

Here, the flag information may have a true value if a printing order has been advanced, and a false value if a printing order has not been advanced.

The image forming apparatus 100 may further consider the flag information when changing a printing order and change a printing order of a print data of a user who arrives afterwards.

If a print data of which a printing order precedes a printing order of a print data corresponding to a user who arrives afterwards is present and flag information of a print data with a precedence order is true, the image forming apparatus 100 may not change a printing order.

In contrast, when the flag information of the print data with the precedence order is false, the image forming apparatus 100 may change printing orders of the print data with the precedence order and the print data of the user who arrives afterwards.

Accordingly, the image forming apparatus 100 utilizing the flag information may first print the print data corresponding to the user who arrives first before the print data corresponding to the user who arrives afterwards.

The operations described above may be equally applied to not only when one or two terminals are connected to the image forming apparatus 100, but also when three or more terminals are connected to the image forming apparatus 100.

As described above, the image forming apparatus according to an example may, not only when only one terminal is connected to the image forming apparatus, but also when a plurality of terminals are connected to the image forming apparatus, change printing orders of print data according to whether or not the plurality of terminals are approaching.

Figure 8:
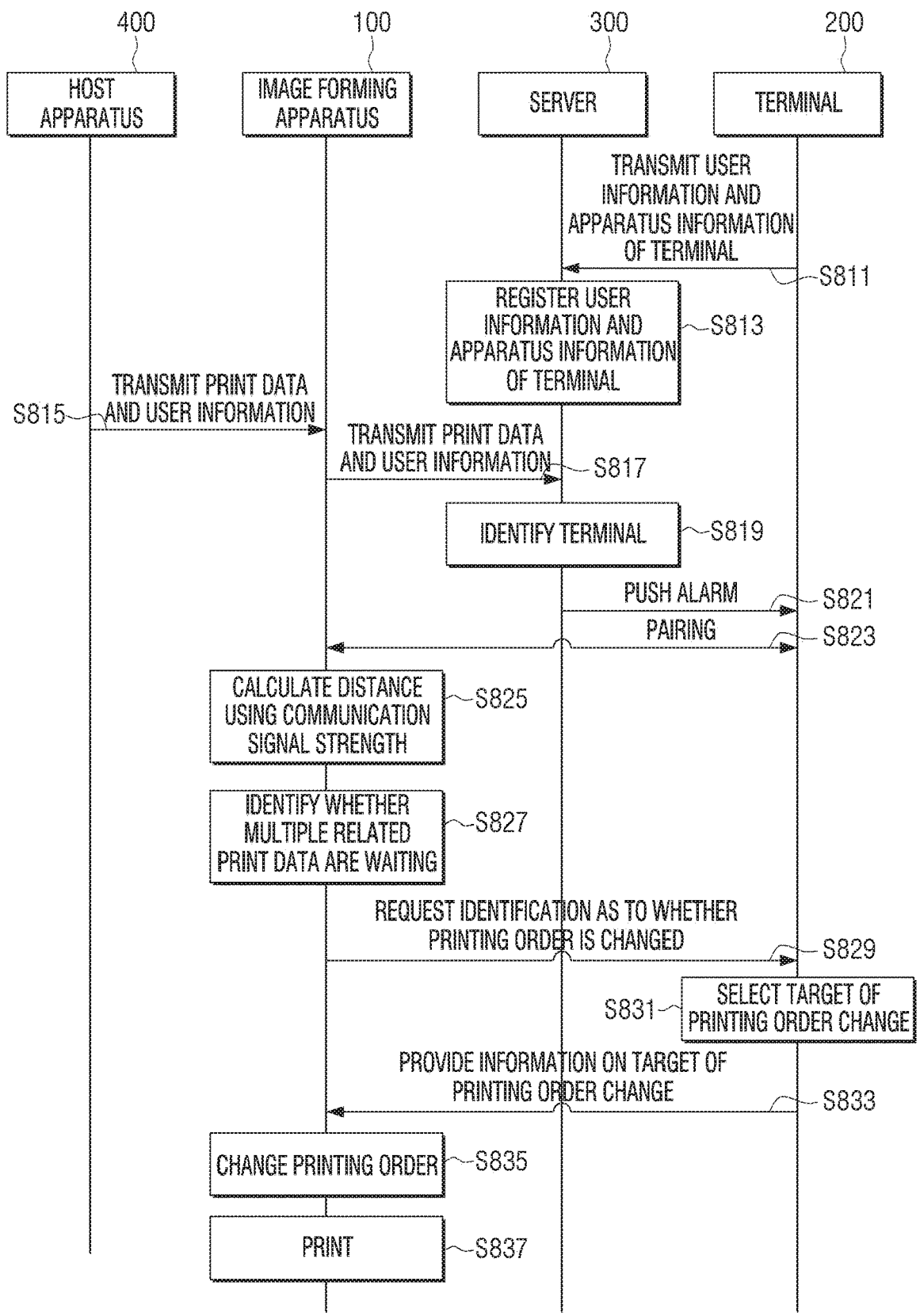
FIG. 8 is a sequence diagram of a method for changing a printing order, according to an example.

FIG. 8 is a sequence diagram of a method for changing a printing order, according to an example.

Referring to FIG. 8, the terminal 200 may transmit user information and apparatus information of the terminal 200 to a server 300, at operation S811. For example, the terminal 200 may transmit information on a user account (e.g., a user ID, a password, etc.) of a user who logs in through the terminal 200 and apparatus information of the terminal 200.

The server 300 may register and store the received user information and the received apparatus information of the terminal 200, at operation S813.

The server 300 may allocate a token for each user account, map the allocated token with each user information, and store the allocated token. Here, the token allocated for each user account may be utilized to authenticate a user account. Further, the server 300 may transmit to the terminal 200 a token corresponding to a user of the terminal 200.

The user may register a new terminal in the server 300. In this case, the server 300 may receive, from the new terminal, user account information and apparatus information of the new terminal and register apparatus information of the new terminal with respect to the user account. Further, the server 300 may provide a new token with respect to the user account.

A host apparatus 400 may transmit a print data and user information to the image forming apparatus 100, at operation S815. For example, the host apparatus 400 may transmit information on a user account of a user who logs in through the host apparatus 400 and a print data to the image forming apparatus 100.

The image forming apparatus 100 may transmit the received print data and the received user information to the server 300, at operation S817. For example, the image forming apparatus 100 may store the received print data and the received user information, transmit the print data and the user information back to the server 300, and request user authentication.

The server 300 may, based on the received user information, identify the corresponding terminal 200, at operation S819. For example, the server 300 may compare the received user information with pre-registered user information and pre-registered apparatus information and identify the corresponding terminal 200.

When the host apparatus 400 holds a token corresponding to the user information, it may be implemented such that the host apparatus 400 transmits a print data and a token corresponding to a user of the print data to the image forming apparatus 100. In this case, the image forming apparatus 100 may transmit the received print data and the received token to the server 300, and the server 300 may perform authentication using the token. The server 300 may identify the terminal 200 corresponding to a user performing the authentication.

The server 300 may transmit a push alarm to the identified terminal 200, at operation S821. For example, the server 300 may, as an approach is made to the terminal 200 and the image forming apparatus 100, transmit to the identified terminal 200 a push alarm to inquire whether a function of advancing a printing order of a print data corresponding to the user of the terminal 200 is performed.

In this case, when the user of the terminal 200 agrees to perform the function described above, in order to connect the terminal 200 to the image forming apparatus 100, the server 300 may further transmit information on a device ID of the image forming apparatus 100.

When the user of the terminal 200 agrees to perform the function described above, a wireless communication access with the image forming apparatus 100 may be performed using the received device ID information of the image forming apparatus 100, at operation S823. Here, the wireless communication method may be a BLE method.

When the host apparatus 400 transmits a token to the image forming apparatus 100, the image forming apparatus 100 may request token information to the terminal 200, and perform user authentication using the token from the terminal 200. When the authentication is completed, the image forming apparatus 100 may perform a wireless access with the terminal 200.

The image forming apparatus 100 may calculate a distance between the image forming apparatus 100 and the terminal 200 by using a strength of a communication signal with the terminal 200, at operation S825.

The image forming apparatus 100 may, when a calculated distance is decreased, identify whether a plurality of print data corresponding to the user of the terminal 200 are waiting, at operation S827.

The image forming apparatus 100 may, when a plurality of print data corresponding to the user of the terminal 200 are waiting, inquire of the terminal 200 whether it is necessary to change an order among a plurality of waiting print data corresponding to a user of the terminal, at operation S829.

The terminal 200 may display the received print data information via a user interface and allow a user selection of at least one print data of which an order is to be advanced from among the displayed print data, at operation S831.

The terminal 200 may transmit information on the selected print data to the image forming apparatus 100, at operation S833.

The image forming apparatus 100 may advance a printing order of the received selected print data from among the plurality of waiting print data corresponding to the user of the terminal 200, at operation S835.

The image forming apparatus 100 may sequentially print the plurality of print data according to the changed printing order, at operation S837.

As described above, the image forming apparatus according to an example of the disclosure may, even when a print data is received from a host apparatus different from a wirelessly-connected terminal, perform connection with a terminal of a user corresponding to the received print data, and perform a printing order changing operation according to whether the terminal is approaching.

Figure 9:
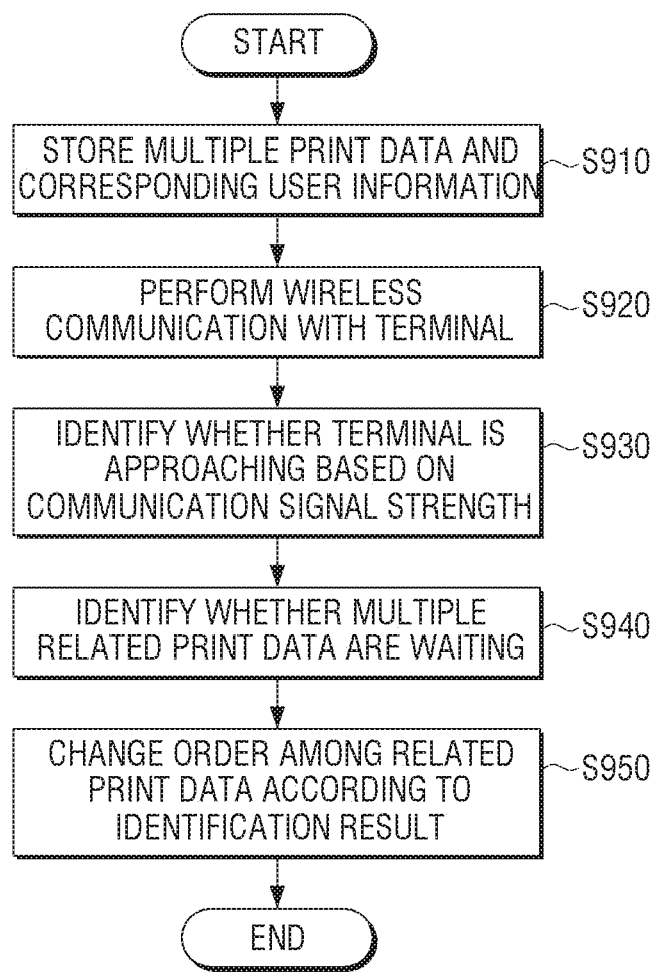
FIG. 9 is a flowchart provided to explain an image forming method, according to an example.

FIG. 9 is a flowchart provided to explain an image forming method, according to an example.

Referring to FIG. 9, a plurality of print data and user information corresponding to each of the plurality of print data are stored, at operation S910. For example, the plurality of print data and the user information corresponding to each of the plurality of print data may be received from an external apparatus, and the received plurality of print data and the received user information corresponding to each of the plurality of print data may be stored.

Here, the user information may include information on a user account (e.g., a user ID, a password, etc.) and may include a token assigned for each user account.

A communication with a peripheral terminal may be performed through a wireless communication method, at operation S920. Here, the wireless communication method may be a BLE method, but is not limited thereto.

Based on a strength of a communication signal with a terminal connected through a wireless communication method, it may be identified whether the terminal is approaching, at operation S930. For example, a distance between terminals may be calculated using a strength of a communication signal with a connected terminal, and it may be identified whether the terminal is approaching based on whether the calculated distance is increased or decreased.

For example, it may be identified that the terminal moves away when the calculated distance is increased, that the terminal is approaching when the calculated distance is decreased, and that the terminal maintains a current position when the calculated distance is constant.

When it is identified that the terminal is approaching, it may be identified that a plurality of print data corresponding to the user of the terminal are waiting, at operation S940.

For example, when it is identified that the terminal is approaching, user information may be received from the terminal. The received user information may be compared with the user information corresponding to each of the plurality of print data and it may be identified whether a plurality of waiting print data corresponding to the user of the terminal are present.

In an example, an order among the plurality of print data waiting in the terminal may be changed according to the identification result, at operation S950.

Before the order is changed, it is possible to inquire of the terminal whether it is necessary to change an order among the plurality of waiting print data corresponding to the user of the terminal.

If a request for order change is not received from the terminal or information regarding the unnecessity of order change is received from the terminal, the printing order may be maintained.

In contrast, if a request for order change is received from the terminal, an order among the plurality of waiting print data corresponding to the user of the terminal may be changed.

For example, information on at least one print data of which an order is to be advanced from among the plurality of waiting print data corresponding to the user of the terminal may be received from the terminal, and a printing order of the at least one print data may be changed within an order among the plurality of print data corresponding to the user of the terminal.

For example, when a distance from the terminal is decreased, the printing order of the at least one print data may be advanced. In contrast, when a distance from the terminal is increased, the printing order of the at least one print data may be maintained.

The pre-stored user information may include information on whether a printing order change is permitted. The information on whether a printing order change is permitted may refer to information on whether, when a print data corresponding to specific user information (e.g., user A) is waiting in the image forming apparatus 100, it is permitted to change a printing order of a print data corresponding to another user information with a subsequent printing order to have a printing order preceding a print data corresponding to the specific user information (user A).

Based on user information of a print data corresponding to another user with an order preceding at least one print data, it may be identified whether changing a printing order of the print data with the precedence order is permitted.

If changing a printing order of the print data with the precedence order is permitted, the printing order of the at least one print data may be earlier than the print data with the precedence order.

If changing a printing order of the print data with the precedence order is not permitted, the printing order of the at least one print data may be maintained without further advancing.

At least one print data of which an order is to be advanced may be printed, or the at least one print data and the print data of which the order is to be advanced may be printed. In this case, changing a printing order is not possible and thus, the printing order may be maintained.

A message indicating that changing a printing order is not possible may be transmitted to the terminal.

As described above, an example method for image forming may include changing an order among corresponding print data based on a strength of a communication signal with a terminal connected through a wireless communication method. Accordingly, a user carrying the terminal can retrieve an output of a specific print data more quickly by approaching the image forming apparatus.

The example method for image forming as shown in FIG. 9 may be executed on an image forming apparatus having a configuration as shown in FIG. 1 or FIG. 2, or may be executed on an image forming apparatus having other configurations.

In addition, the above-described example method for image forming may be realized as at least one execution program to execute the above-described controlling method, and such an execution program may be stored in a non-transitory computer readable medium.

While the general inventive concept has been shown and described with reference to certain examples thereof, it will be understood by those skilled in the art that various changes in form and detail may be made therein without departing from the spirit and principles of the present general inventive concept, the scope of which is defined by the appended claims and their equivalents.

What is claimed is:

1. An image forming apparatus, comprising:
   a print engine to form an image;
   a memory to store a plurality of print data and user information corresponding to each of the plurality of print data;
   a communication apparatus to:
      communicate with a terminal through a wireless communication method; and
      communicate with a host apparatus to receive the plurality of print data and user information corresponding to each of the plurality of print data from the host apparatus; and
   a processor to control the print engine to print the plurality of print data,
   wherein the processor is to:
      identify whether the terminal is approaching based on a strength of a communication signal with the terminal connected through the wireless communication method;
      based on identifying that the terminal is approaching, identify whether a plurality of waiting print data corresponding to a user of the terminal are present;
      control the communication apparatus to inquire of the terminal whether an order change among the waiting plurality of print data is necessary according to a result of the identification; and
      based on a request for the order change being received from the terminal, change an order among the waiting plurality of print data.

2. The image forming apparatus as claimed in claim 1, wherein the processor is to:
   receive, from the terminal, information on at least one print data of which an order is to be advanced from among the waiting plurality of print data; and
   advance a printing order of the at least one print data.

3. The image forming apparatus as claimed in claim 2, wherein the processor is to:
   calculate a distance between the image forming apparatus and the terminal by using the strength of the communication signal with the terminal; and
   based on the calculated distance being decreased, advance a printing order of the at least one print data.

4. The image forming apparatus as claimed in claim 2, wherein the processor is to:
   calculate a distance between the image forming apparatus and the terminal by using the strength of the communication signal with the terminal; and
   based on the calculated distance being increased, maintain a printing order of the at least one print data.

5. The image forming apparatus as claimed in claim 2, wherein the user information includes information on whether the order change is permitted, and
   wherein the processor is to:
      identify whether an order change of a print data of which an order precedes an order of the at least one print data is permitted based on the user information corresponding to each of the plurality of print data; and
      based on the order change being permitted, advance a printing order of the at least one print data to be earlier than a printing order of the print data with a precedent order.

6. The image forming apparatus as claimed in claim 5, wherein the processor is to, based on the print engine performing a printing of the print data with the precedent order, maintain a printing order of the at least one print data.

7. The image forming apparatus as claimed in claim 1, wherein the processor is to, based on the printing order being changed, control the communication apparatus to transmit information on the changed printing order to the terminal.

8. The image forming apparatus as claimed in claim 1, wherein the communication apparatus is to request a server to authenticate the received plurality of print data and user information corresponding to each of the plurality of print data.

9. The image forming apparatus as claimed in claim 8, wherein the communication apparatus is to receive a token from the host apparatus and request the server to authenticate the received plurality of print data and user information corresponding to each of the plurality of print data using the token.

10. A method for forming an image, the method comprising:
   communicating with a host apparatus to receive a plurality of print data and user information corresponding to each of the plurality of print data from the host apparatus;
   storing the plurality of print data and user information corresponding to each of the plurality of print data;
   communicating with a peripheral terminal through a wireless communication method;
   identifying whether the terminal is approaching based on a strength of a communication signal with the terminal connected through the wireless communication method;
   based on identifying that the terminal is approaching, identifying whether a plurality of waiting print data corresponding to a user of the terminal are present;
   inquiring of the terminal whether the order change among the waiting plurality of print data is necessary according to the identification result; and
   changing an order among the waiting plurality of print data based on a request for the order changes being received from the terminal.

11. The method as claimed in claim 10, wherein the changing the order comprises:
   acquiring, from the terminal, information on at least one print data of which an order is to be advanced from among the waiting plurality of print data; and
   advancing a printing order of the at least one print data.

12. The method as claimed in claim 11,
   wherein the identifying whether the terminal is approaching comprises calculating a distance from the terminal by using the strength of the communication signal with the terminal, and
   wherein the changing the order comprises, based on the calculated distance being decreased, advancing a printing order of the at least one print data.

13. The method as claimed in claim 11,
   wherein the identifying whether the terminal is approaching comprises calculating a distance between the image forming apparatus and the terminal by using the strength of the communication signal with the terminal, and
   wherein the changing the order comprises, based on the calculated distance being increased, maintaining a printing order of the at least one print data.

14. The method as claimed in claim 11,
   wherein the user information includes information on whether the order change is permitted, and
   wherein the changing the order comprises:
   identifying whether an order change of a print data of which an order precedes an order of the at least one print data is permitted based on the user information corresponding to each of the plurality of print data; and
   based on the order change being permitted, advancing a printing order of the at least one print data to be earlier than a printing order of the print data with a precedent order.

15. The method as claimed in claim 14, wherein the changing the order comprises, based on the print engine performing a printing of the print data with the precedent order, maintaining a printing order of the at least one print data.

16. The method as claimed in claim 10, further comprising requesting a server to authenticate the received plurality of print data and user information corresponding to each of the plurality of print data.

17. The method as claimed in claim 16, further comprising:
   receiving a token from the host apparatus; and
   requesting the server to authenticate the received plurality of print data and user information corresponding to each of the plurality of print data using the token.

* * * * *